United States Patent
Sunila et al.

(10) Patent No.: US 12,477,352 B2
(45) Date of Patent: Nov. 18, 2025

(54) COMPUTER IMPLEMENTED METHOD FOR CONTROLLING A COMMUNICATIONS NETWORK

(71) Applicant: Elisa Oyj, Helsinki (FI)

(72) Inventors: Karri Sunila, Helsinki (FI); Vili Kilpeläinen, Helsinki (FI)

(73) Assignee: Elisa Oyj, Helsinki (FI)

( * ) Notice: Subject to any disclaimer, the term of this patent is extended or adjusted under 35 U.S.C. 154(b) by 331 days.

(21) Appl. No.: 18/039,120

(22) PCT Filed: Nov. 18, 2021

(86) PCT No.: PCT/FI2021/050782
§ 371 (c)(1),
(2) Date: May 26, 2023

(87) PCT Pub. No.: WO2022/117910
PCT Pub. Date: Jun. 9, 2022

(65) Prior Publication Data
US 2023/0422047 A1 Dec. 28, 2023

(30) Foreign Application Priority Data
Dec. 3, 2020 (FI) ..................... 20206242

(51) Int. Cl.
*H04W 16/18* (2009.01)
*H04W 16/28* (2009.01)
*H04W 48/16* (2009.01)

(52) U.S. Cl.
CPC ........... *H04W 16/18* (2013.01); *H04W 16/28* (2013.01); *H04W 48/16* (2013.01)

(58) Field of Classification Search
CPC .............................. H04W 16/18; H04W 16/16
(Continued)

(56) References Cited

U.S. PATENT DOCUMENTS

| 2011/0188384 A1 | 8/2011 | Ortega et al. |
| 2015/0011198 A1 | 1/2015 | Wellington |

(Continued)

FOREIGN PATENT DOCUMENTS

| EP | 2110990 A1 | 10/2009 |
| EP | 3094047 A1 | 11/2016 |
| WO | 2015135102 A1 | 9/2015 |

OTHER PUBLICATIONS

European Patent Office, Notification of Transmittal of the International Search Report and the Written Opinion of the International Searching Authority, or the Declaration; International Application No. PCT/FI2021/050782, dated Feb. 23, 2022, 14 Pages.

(Continued)

*Primary Examiner* — Chuck Huynh
(74) *Attorney, Agent, or Firm* — ZIEGLER IP LAW GROUP, LLC.

(57) ABSTRACT

A computer implemented method for controlling a communications network. The method includes obtaining, from the network, cell identifiers, remote electrical tilt, RET, equipment identifiers, link data comprising information about links between cells and RET equipment, and network configuration data, and, from a data storage, network planning data; finding a first cell, if any, missing a link to a RET equipment; searching based on comparing the network configuration data and the network planning data to which RET equipment, if any, the first cell should be linked, and responsive to detecting that the first cell and a first RET equipment should be linked, forming a link between the first cell and the first RET equipment; updating the link data with information comprising the formed link, if any; and using the updated link data in network control operations.

8 Claims, 2 Drawing Sheets

---

330A: Searching a link by comparing site name data, base station identifier data, and azimuth identifier data of the network configuration data and the planning data.

330B: Searching a link by comparing site name data, base station identifier data, and sector identifier data of the network configuration data and the planning data.

330C: Link between the first cell and a RET equipment is searched by investigating a second cell linked to a same antenna element as the first cell.

(58) Field of Classification Search
USPC .......................................................... 455/445
See application file for complete search history.

(56) References Cited

U.S. PATENT DOCUMENTS

| | | |
|---|---|---|
| 2016/0057633 A1 | 2/2016 | Eskelinen et al. |
| 2017/0365921 A1 | 12/2017 | Webb et al. |
| 2019/0289514 A1* | 9/2019 | Ronen ....................... H01Q 3/08 |

OTHER PUBLICATIONS

Finnish Patent and Registration Office, Search Report, Patent Application No. 20206242, dated Jun. 22, 2021, 2 pages.

* cited by examiner

COMPUTER IMPLEMENTED METHOD FOR CONTROLLING A COMMUNICATIONS NETWORK

TECHNICAL FIELD

The present disclosure generally relates to controlling a communications network.

BACKGROUND

This section illustrates useful background information without admission of any technique described herein representative of the state of the art.

Cellular communications networks are complex systems comprising a plurality of cells serving users of the network. When users of the communications network move in the area of the network, connections of the users are seamlessly handed over between cells of the network. There are various factors that affect operation of individual cells and co-operation between the cells. In order for the communications network to operate as intended and to provide planned quality of service, cells of the communications network need to operate as planned. For example, the cells need to provide sufficient coverage without too much interfering with operation of neighboring cells.

There are various automated measures that monitor operation of the communications networks in order to detect any problems in operation of the network as soon as possible so that operation of the network can be optimized. There is constant desire to develop methods that enable automation of the optimization actions or at least performing the optimization actions remotely without needing to visit base station sites. There may be a need to adjust antenna tilts, for example. Remote electrical tilt (RET) is a functionality that allows adjustment of antenna tilt remotely. Using RET in automated actions requires that the RET operates as intended.

SUMMARY

The appended claims define the scope of protection. Any examples and technical descriptions of apparatuses, products and/or methods in the description and/or drawings not covered by the claims are presented not as embodiments of the present disclosure but as background art or examples useful for understanding the present disclosure.

According to a first example aspect there is provided a computer implemented method for controlling a communications network. The method comprises obtaining, from the network, cell identifiers, remote electrical tilt, RET, equipment identifiers, link data comprising information about links between cells and RET equipment, and network configuration data, and, from a data storage, network planning data; finding a first cell, if any, missing a link to a RET equipment; searching based on comparing the network configuration data and the network planning data to which RET equipment, if any, the first cell should be linked, and responsive to detecting that the first cell and a first RET equipment should be linked, forming a link between the first cell and the first RET equipment; updating the link data with information comprising the formed link, if any; and using the updated link data in network control operations.

In an embodiment, searching to which RET equipment, if any, the first cell should be linked is based on comparing site name data, base station identifier data, and azimuth identifier data.

In an embodiment, searching to which RET equipment, if any, the first cell should be linked is based on comparing site name data, base station identifier data, and sector identifier data.

In an embodiment, searching to which RET equipment, if any, the first cell should be linked is based on checking if a second cell, linked to a same antenna or to a same antenna element as the first cell, is linked to a RET equipment.

In an embodiment, an error message is provided in response to detecting that the first cell should be linked to a RET equipment but the first cell could not be linked to any RET equipment.

In an embodiment, in response to detecting that no links are missing and/or a cell that is not linked to any RET equipment should not be linked to any RET equipment, providing a confirmation output message.

In an embodiment, responsive to detecting that a link between the first cell and the first RET equipment is formed, checking if angle information of the first RET equipment differs from the network planning data; and responsive to detecting the angle information of the first RET equipment differs from the network planning data, providing output information comprising an error message and/or initiating corrective actions.

In an embodiment, the method is repeated for all the cells of a base station, all the cells of selected base stations, or all the cells of the network.

In an embodiment, an existing link between a cell and a RET equipment is verified, and in response to detecting an incorrect link, correcting the link and/or providing output information indicating the incorrect link.

According to a second example aspect, there is provided an apparatus comprising a processor and a memory including computer program code; the memory and the computer program code configured to, with the processor, cause the apparatus to perform the method of the first aspect or any related embodiment.

According to a third example aspect, there is provided a computer program comprising computer executable program code which when executed by a processor causes an apparatus to perform the method of the first aspect or any related embodiment.

According to a fourth example aspect there is provided a computer program product comprising a non-transitory computer readable medium having the computer program of the third example aspect stored thereon.

According to a fifth example aspect there is provided an apparatus comprising means for performing the method of any preceding aspect.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments have been illustrated in the foregoing. The embodiments in the foregoing are used merely to explain selected aspects or steps that may be utilized in different implementations. Some embodiments may be presented only with reference to certain example aspects. It should be appreciated that corresponding embodiments may apply to other example aspects as well.

BRIEF DESCRIPTION OF THE FIGURES

Some example embodiments will be described with reference to the accompanying figures, in which.

DETAILED DESCRIPTION

In the following description, like reference signs denote like elements or steps.

Example embodiments of the present disclosure provide mechanisms to control operation of cellular communications networks and to verify that remote electrical tilt (RET) operates as intended. In particular various embodiments provide finding inaccurate RET data and correcting any found inaccurate RET data. Tilting of antennas is playing very important role in radio network optimization. With RET equipment, tilting can be automatized. In order for the optimization to work as intended, an accurate data of all the cells using an antenna mounted to a particular RET equipment is required. Thus, each cell using an antenna with RET equipment needs to be linked to a correct RET equipment in the network configuration data. In particular, knowledge of which cells are linked to each RET equipment, i.e. the link data, is required.

If some of the links are missing, using RET equipment may have unexpected effects on cell operation. By means of various embodiments of present disclosure, missing links may be formed and/or existing links can be verified. In addition, data indicating that a cell is not coupled to any RET equipment may be verified.

It is to be noted that, in the following, mainly monitoring of a single network site is discussed, but clearly plurality of network sites may be monitored correspondingly in parallel or sequentially one after another.

Figure 1:
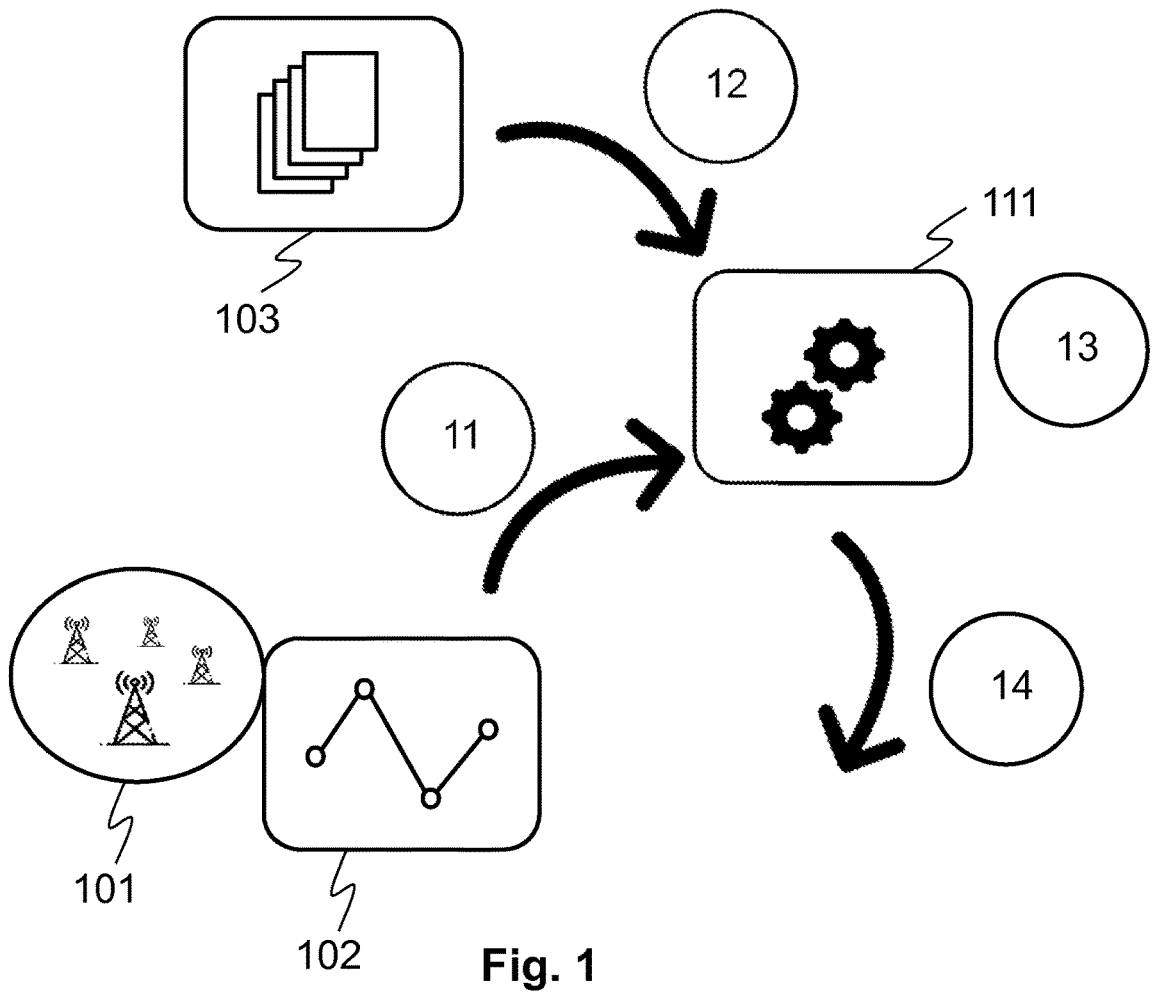
FIG. 1 shows an example scenario according to an embodiment.

FIG. 1 shows an example scenario according to an embodiment. The scenario shows a communications network 101 comprising a plurality of cells and base stations and other network devices, and an operations support system (OSS) 102 that manages operations of the communications network 101. Further, the scenario shows a data storage 103 configured to store information related to the communications network 101, and an automation system 111 configured to control the communications network according to example embodiments. The data storage 103 may store information about planned configuration of the communications network comprising for example information about physical devices used in the communications network 101 and about structure of the communications network 101.

In an embodiment the scenario of FIG. 1 operates as follows: In phase 11, the automation system 111 obtains data from the OSS 102. The data comprises at least information associated with RET equipment deployed in the communications network 101. The data may comprise data related to one base station site or data related to a plurality of base station sites. Also other data may be obtained from the OSS 102.

In phase 12, the automation system 111 obtains data from the data storage 103. The data comprises at least information associated with the planned configuration of the communications network 101. The data may comprise data related to one base station site or data related to a plurality of base station sites. Other data may be obtained from the data storage 103, too.

In phase 13, the automation system 111 processes the data from the OSS and the data from the data storage to identify missing and/or incorrect linking between cells and RET equipment of the communications network 101. After identifying missing and/or incorrect linking, correct link information between cells and RET equipment is provided if possible.

In phase 14, if a missing link cannot be formed and/or an incorrect link corrected, an alarm is output for further actions such as for example maintenance actions at a base station site or corrections in the data storage.

The process may be manually or automatically triggered. The process may be periodically repeated. The process may be repeated for example once a day, once a week, every two weeks, or once a month. By periodically repeating the process, effective network monitoring and controlling is achieved and problems, if any, may be timely detected. Additionally or alternatively, the process may be triggered, for example, in response to observing problems in the network. Still further, the process may be performed in connection with deployment of new cells or base station site, deployment of new physical equipment in the base station site and/or maintenance actions performed in the base station site. In this way any problems with the newly deployed equipment may be detected right away.

Figure 2:
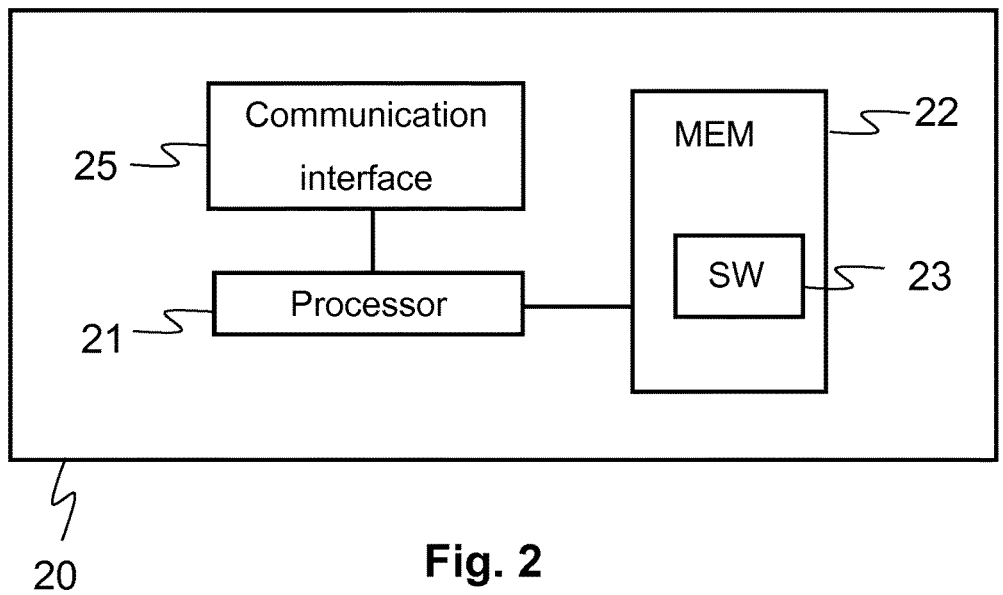
FIG. 2 shows an apparatus according to an embodiment.

FIG. 2 shows an apparatus 20 according to an embodiment. The apparatus 20 is for example a general-purpose computer or server or some other electronic data processing apparatus. The apparatus 20 can be used for implementing embodiments of the present disclosure. That is, with suitable configuration the apparatus 20 is suited for operating for example as the automation system 111 of foregoing disclosure.

The general structure of the apparatus 20 comprises a processor 21, and a memory 22 coupled to the processor 21. The apparatus 20 further comprises software 23 stored in the memory 22 and operable to be loaded into and executed in the processor 21. The software 23 may comprise one or more software modules and can be in the form of a computer program product. Further, the apparatus 20 comprises a communication interface 25 coupled to the processor 21.

The processor 21 may comprise, e.g., a central processing unit (CPU), a microprocessor, a digital signal processor (DSP), a graphics processing unit, or the like. FIG. 2 shows one processor 21, but the apparatus 20 may comprise a plurality of processors.

The memory 22 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 20 may comprise a plurality of memories.

The communication interface 25 may comprise communication modules that implement data transmission to and from the apparatus 20. The communication modules may comprise, e.g., a wireless or a wired interface module. The wireless interface may comprise such as a WLAN, Bluetooth, infrared (IR), radio frequency identification (RF ID), GSM/GPRS, CDMA, WCDMA, LTE (Long Term Evolution) or radio module. The wired interface may comprise such as Ethernet or universal serial bus (USB), for example. Further the apparatus 20 may comprise a user interface (not shown) for providing interaction with a user of the apparatus. The user interface may comprise a display and a keyboard, for example. The user interaction may be implemented through the communication interface 25, too.

A skilled person appreciates that in addition to the elements shown in FIG. 2, the apparatus 20 may comprise other elements, such as displays, as well as additional circuitry such as memory chips, application-specific integrated circuits (ASIC), other processing circuitry for specific purposes and the like. Further, it is noted that only one apparatus is shown in FIG. 2, but the embodiments of the present disclosure may equally be implemented in a cluster of shown apparatuses.

Figure 3A:
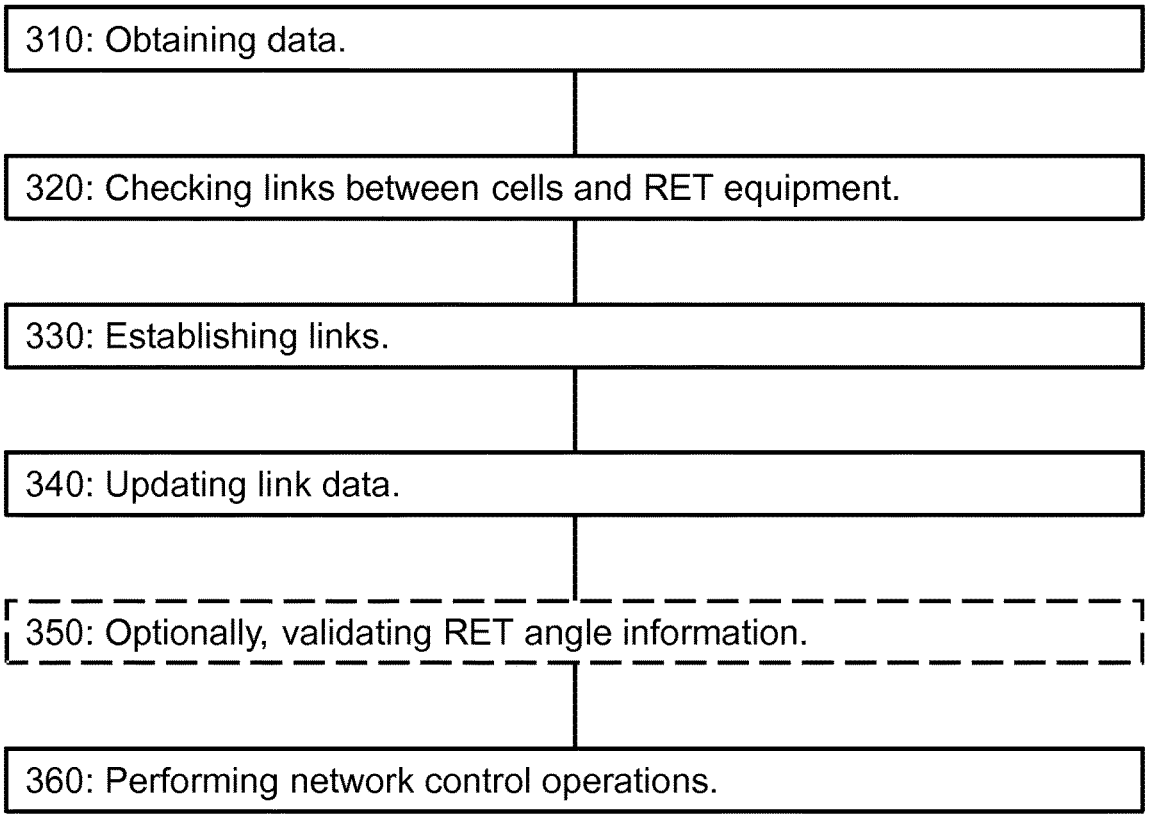
FIGS. 3A-3B show flow charts of example methods according to example embodiments.
Figure 3B:
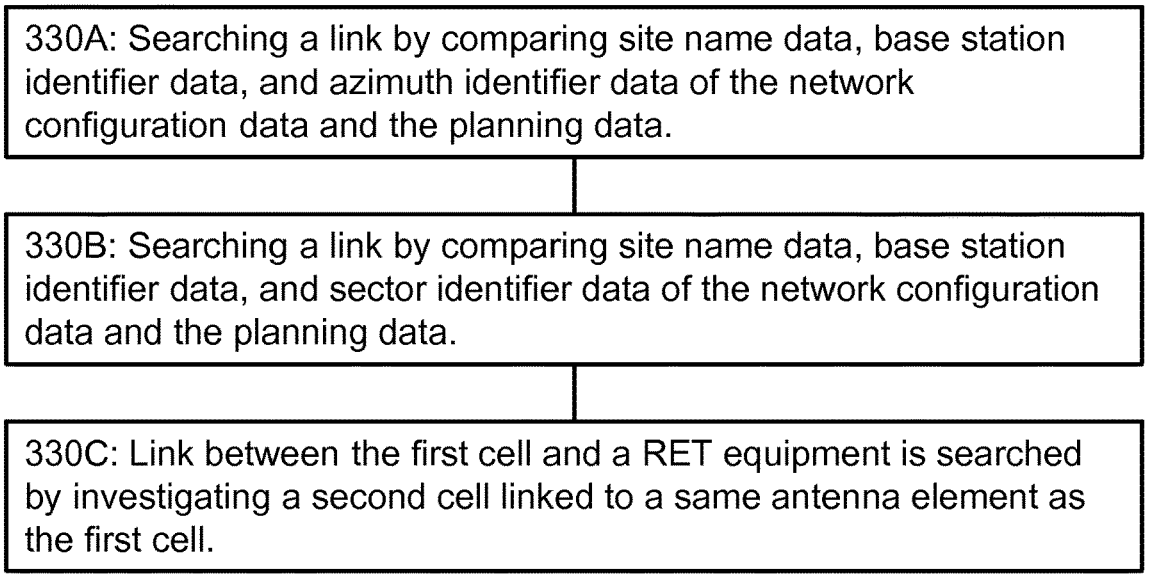

FIGS. 3A-3B show flow charts of example methods according to example embodiments. FIG. 3A illustrates a computer implemented method for controlling a communications network comprising various possible process steps including some optional steps while also further steps can be included and/or some of the steps can be performed more than once:

310: Obtaining data. Data comprising cell identifiers, RET equipment identifiers, and link data comprising information about links between cells and RET equipment is received from the network. Additionally, network configuration data and network planning data are obtained. Network configuration data, obtained from the network, and network planning data, obtained from a data storage, may comprise, site name data, base station identifier data, technology identifier data, frequency identifier data, antenna identifier data, antenna element identifier data, sector identifier data, and azimuth identifier data. The network configuration data is read from the live network and is associated with existing configuration of the network. That is, the network configuration data provides information on how the network has been set up. Based on this information it is possible to derive information on existing connections between RET equipment and antenna elements. The network planning data is read from the data storage and is associated with the pre-planned configuration of the network. That is, the network planning data provides information on how the network was intended to be set up or is believed to be set up. The obtained data may comprise data related to all base stations or selected base stations of a network. In some embodiments, also other data related to network configuration or operation, required for finding links between cells and RET equipment, may be obtained.

320: Checking links between cells and RET equipment. This may refer to checking if there are any links from cells to a RET equipment. Additionally or alternatively, existing links may be verified. In an embodiment, it is checked if the link data links each cell to a RET equipment. In an example embodiment, it may be checked if RET angle information and/or RET equipment information exists for all cells. In an embodiment, it may be checked if all RET equipment are linked to a cell or cells. In an example embodiment, the link data may comprise information indicating that a cell should not be linked to any RET equipment. If it is found that all links exist in the link data and/or the link data is correct, the process may proceed to step 340. In an embodiment, in response to finding that a cell is not linked to any RET equipment, the process proceeds to step 330. Additionally or alternatively, in an example embodiment, existing links between cells and RET equipment may be verified.

In an example embodiment, verifying existing links is performed based on comparing the network configuration data and the network planning data. Similar methods may be used as in establishing completely missing links.

330: Establishing links. Checking to which RET equipment, if any, a first cell should be linked based on the obtained network configuration data and network planning data. In an example embodiment, responsive to detecting that the first cell and a first RET equipment should be linked, forming a link between the first cell and the first RET equipment. In an embodiment, it may be found that the first cell should not be linked to any RET equipment due to e.g. the first cell using antennas without ability to remote electrical tilt. In an example embodiment, a RET equipment to be linked to the first cell is searched through steps 330A-330C shown in FIG. 3B.

340: Updating link data. The link data is updated with information comprising the formed link or links, if any. In an embodiment, the link data may be updated with information comprising knowledge of a missing link/links and/or a verified link/links and/or an identifier that a cell should not be linked to any RET equipment.

350: Optionally, validating RET angle information. In an embodiment, angle information of a first RET equipment is compared to the network planning data and responsive to detecting a difference, providing output information comprising an error message. In an embodiment, corrective actions may be initiated. The first RET equipment may be selected based on a link in the obtained link data to a first cell or based on a formed link to a first cell.

360: Performing network control operations. In an embodiment, the updated link data is used in network control operations. The network control operations may comprise remote electrical tilting of antennas that may be needed in connection with network optimization or expansion of the network, for example.

FIG. 3B shows an embodiment, wherein the method step 330 comprises the following sub-steps:

330A: Link between a first cell and a RET equipment is searched by comparing network planning data and network configuration data both comprising site name data, base station identifier data, and azimuth identifier data. In an example embodiment, a key is created from the network planning data, wherein the key comprises site name, azimuth identifier, technology identifier, and frequency identifiers. In an example case, the key could be e.g. Site1*25*GSM900. A RET equipment to be linked to first cell is then sought by searching corresponding key from the network configuration data. The search may be repeated for each cell still missing RET information. In response to detecting that the first cell and a first RET equipment should be linked, a link is formed between the first cell and the first RET equipment, and the process may proceed to step 340. If a RET equipment for the first cell is not found, the method proceeds to 330B.

330B: Link between the first cell and a RET equipment is searched by comparing network planning data and network configuration data both comprising site name data, base station identifier data, and sector identifier data. In an example embodiment, a key is created from the network planning data, wherein the key comprises site name, sector identifier, technology identifier, and frequency identifiers. In an example case, the key could be e.g. Site1*A1*GSM900. Sector identifier (A1, A2, A3) is created from unique macro sector azimuths, wherein A1 is the smallest azimuth and so on. A RET equipment to be linked to first cell is then sought by searching corresponding key from the network configuration data. The search may be repeated for each cell still missing RET information. In response to detecting that the first cell and a first RET equipment should be linked, a link is formed between the first cell and the first RET equipment, and the process may proceed to step 340. If a RET equipment for the first cell is not found, the method proceeds to 330C.

330C: In an embodiment, antenna identifiers and different antenna element identifiers are presented in the network planning data. If RET information can be found for a second cell connected to a same antenna or antenna element as the first cell, then it can be deduced that the first and second cells should have the same RET information. In response to detecting that the first cell and a first RET equipment should be linked, a link is formed between the first cell and the first RET equipment. The process may proceed to step 340.

The method may be performed for all the cells of a base station, all the cells of selected base stations, or all the cells of a network. In an embodiment, the method may be performed for selected cells and/or selected RET equipment of a network. In an example embodiment, the method is performed for newly installed and/or recently maintained apparatus or equipment.

An example of updating link data is illustrated using Tables 1-3. Table 1 shows an example network configuration data obtained from a network. Table 2 shows an example planning data obtained from a data storage. Tables 1-2 only comprise data required for the following example steps of the method. The data shown in Table 3 comprises an example of updated link data corresponding to step 340 of the method of FIGS. 3A-3B based on method steps 310-340 and data comprised in Tables 1-2. The columns of Table 3 comprise site name, cell identifier data, frequency identifier data, antenna identifier data, transmitter identifier data, planned azimuth identifier data, RET equipment azimuth identifier data, planned electrical tilt angle identifier data, RET equipment angle identifier data, calculated tilt difference, base station identifier data, and sector identifier data.

In this example case, RET information for the LTE cells exists in the obtained data or has already been found out using the method steps 310-340. Then, according to method step 330A, a key from the planning data may be created for cell G1 as Site1*25*900, cf. Table 2. Keys are also created from the network configuration data obtained from the network as Site1*110*null, Site1*25*800, Site1*110*800, etc., Site1*25*900, cf. Table 1. Thus, a corresponding key is found from the network configuration data of the last row of Table 1. The search then continues to cell W1, the second row of Table 2, and corresponding key is again found from the network configuration data of the last row of Table 1. Since the links already exist for the LTE cells, the method proceeds to cell G2.

A key Site1*110*900 created at step 330A from Table 2 for cell G2 does not match any of the keys created from the network configuration data of Table 1. Therefore, the method proceeds to step 330B and a key Site1*A2*900 is created for cell G2 from the planning data of Table 2. Sector identifier A2 is deduced from the data, since the data indicates that Site1 comprises sector directions 25, 110, and 270 degrees corresponding to sectors A1, A2 and A3, respectively. A corresponding key is found from the network configuration data of the fifth row of Table 1. The process may then be continued for rest of the cells.

TABLE 1

Example network configuration data obtained from a network.

| Sitename | RET angle | Azimuth | Antenna | BTS_id | Sector_id | Frequency |
|---|---|---|---|---|---|---|
| Site1 | 2 | 110 | TDQM17271765-Y1 | reserve | A2 | |
| Site1 | 7 | 25 | TDQM60901565-R2 | LTE800/1 | A1 | 800 |
| Site1 | 8 | 110 | TDQM60901565-R2 | LTE800/2 | A2 | 800 |
| Site1 | 7 | | TDQM60901565-R1 | SRAN900/2 | A2 | 900 |
| Site1 | 6 | 270 | TDQM17271765-Y2 | LTE1800/3 | A3 | 1800 |
| Site1 | 2 | 25 | TDQM17271765-Y1 | reserve | A1 | |
| Site1 | 2 | 270 | TDQM17271765-Y1 | reserve | A3 | |
| Site1 | 7 | 110 | TDQM17271765-Y2 | LTE1800/2 | A2 | 1800 |
| Site1 | 5 | 25 | TDQM17271765-Y2 | LTE1800/1 | A1 | 1800 |
| Site1 | 8 | 270 | TDQM60901565-R2 | LTE800/3 | A3 | 800 |
| Site1 | 8 | 270 | TDQM60901565-R1 | SRAN900/3 | A3 | 900 |
| Site1 | 7 | 25 | TDQM60901565-R1 | SRAN900/1 | A1 | 900 |

TABLE 2

Example planning data obtained from a data storage.

| Sitename | Cell_id | ETILT angle | Azimuth | Antenna | tx_element | Technology/Frequency |
|---|---|---|---|---|---|---|
| Site1 | G1 | 7 | 25 | TDQM_609015_172717DEI_65FT2 | 1 | GSM900 |
| Site1 | W1 | 7 | 25 | TDQM_609015_172717DEI_65FT2 | 1 | UMTS900 |
| Site1 | L1 | 8 | 25 | TDQM_609015_172717DEI_65FT2 | 2 | LTE800 |
| Site1 | L2 | 5 | 25 | TDQM_609015_172717DEI_65FT2 | 3 | LTE1800 |
| Site1 | G2 | 7 | 110 | TDQM_609015_172717DEI_65FT2 | 1 | GSM900 |
| Site1 | W2 | 7 | 110 | TDQM_609015_172717DEI_65FT2 | 1 | UMTS900 |
| Site1 | L3 | 7 | 110 | TDQM_609015_172717DEI_65FT2 | 2 | LTE800 |
| Site1 | L4 | 7 | 110 | TDQM_609015_172717DEI_65FT2 | 3 | LTE1800 |
| Site1 | W3 | 8 | 270 | TDQM_609015_172717DEI_65FT2 | 1 | UMTS900 |

TABLE 2-continued

Example planning data obtained from a data storage.

| Sitename | Cell_id | ETILT angle | Azimuth | Antenna | tx_element | Technology/Frequency |
|---|---|---|---|---|---|---|
| Site1 | G3 | 8 | 270 | TDQM_609015_172717DEI_65FT2 | 1 | GSM900 |
| Site1 | L5 | 8 | 270 | TDQM_609015_172717DEI_65FT2 | 2 | LTE800 |
| Site1 | L6 | 6 | 270 | TDQM_609015_172717DEI_65FT2 | 3 | LTE1800 |

TABLE 3

Updated link data.

| Sitename | Cell_id | Frequency | Antenna | tx_element | Planned azimuth | RET azimuth | Planned ETILT | RET angle | Tilt difference | BTS_id | Sector_id |
|---|---|---|---|---|---|---|---|---|---|---|---|
| Site1 | G1 | GSM900 | TDQM_609015_172717DEI_65FT2 | 1 | 25 | 25 | 5 | 5 | 0 | SRAN900/1 | A1 |
| Site1 | W1 | UMTS900 | TDQM_609015_172717DEI_65FT2 | 1 | 25 | 25 | 5 | 5 | 0 | SRAN900/1 | A1 |
| Site1 | L1 | LTE800 | TDQM_609015_172717DEI_65FT2 | 2 | 25 | 25 | 6 | 6 | 0 | LTE800/1 | A1 |
| Site1 | L2 | LTE1800 | TDQM_609015_172717DEI_65FT2 | 3 | 25 | 25 | 4 | 4 | 0 | LTE1800/1 | A1 |
| Site1 | G2 | GSM900 | TDQM_609015_172717DEI_65FT2 | 1 | 110 | | 5 | 5 | 0 | SRAN900/2 | A2 |
| Site1 | W2 | UMTS900 | TDQM_609015_172717DEI_65FT2 | 1 | 110 | | 5 | 5 | 0 | SRAN900/2 | A2 |
| Site1 | L3 | LTE800 | TDQM_609015_172717DEI_65FT2 | 2 | 110 | 110 | 6 | 6 | 0 | LTE800/2 | A2 |
| Site1 | L4 | LTE1800 | TDQM_609015_172717DEI_65FT2 | 3 | 110 | 110 | 4 | 4 | 0 | LTE1800/2 | A2 |
| Site1 | G3 | GSM900 | TDQM_609015_172717DEI_65FT2 | 1 | 270 | | 5 | 5 | 0 | SRAN900/3 | A3 |
| Site1 | W3 | UMTS900 | TDQM_609015_172717DEI_65FT2 | 1 | 270 | | 5 | 5 | 0 | SRAN900/3 | A3 |
| Site1 | L5 | LTE800 | TDQM_609015_172717DEI_65FT2 | 2 | 270 | 270 | 6 | 6 | 0 | LTE800/3 | A3 |
| Site1 | L6 | LTE1800 | TDQM_609015_172717DEI_65FT2 | 3 | 270 | 270 | 4 | 4 | 0 | LTE1800/3 | A3 |

The embodiments provide automated methods for controlling a communications network. An advantage is that missing RET equipment information can be discovered automatically. Another advantage is that manual checking of RET angle information is no longer needed. A further advantage is that corrective actions can be initiated immediately when RET angles have been added to system. Yet another advantage is that RET equipment information and/or RET angle information can be checked periodically to ensure that data is valid, and information can be used to tilt antennas automatically. A further advantage is that the method saves time and labor and, therefore, costs.

Yet another advantage is that accuracy of RET equipment information is improved as it is automatically verified that network configuration data and network planning data related to RET equipment match each other. Thereby it may be easier to notice all effects that changes in certain RET equipment may have in the network. With less accurate or incorrect RET equipment information, some effects may go unnoticed and thereby unexpected problems may appear as a consequence of some network optimization actions. Accuracy of RET equipment information may help in ensuring that any corrective actions or management operations performed in the network actually result in the changes that were intended. Likelihood of accidentally e.g. tilting an antenna that was not intended may be reduced.

Various embodiments have been presented. It should be appreciated that in this document, words comprise, include and contain are each used as open-ended expressions with no intended exclusivity.

The foregoing description has provided by way of non-limiting examples of particular implementations and embodiments a full and informative description of the best mode presently contemplated by the inventors for carrying out the embodiments of the present disclosure. It is however clear to a person skilled in the art that the present disclosure is not restricted to details of the embodiments presented in the foregoing, but that it can be implemented in other embodiments using equivalent means or in different combinations of embodiments without deviating from the characteristics of the present disclosure.

Furthermore, some of the features of the afore-disclosed example embodiments may be used to advantage without the corresponding use of other features. As such, the foregoing description shall be considered as merely illustrative of the principles of the present embodiments, and not in limitation thereof. Hence, the scope of the present disclosure is only restricted by the appended patent claims.

The invention claimed is:

1. A computer implemented method for controlling a communications network, the method comprising:
    obtaining, from the network, cell identifiers, remote electrical tilt, RET, equipment identifiers, link data comprising information about links between cells and RET equipment, and network configuration data, and, from a data storage, network planning data;
    finding a first cell, if any, missing a link to a RET equipment;
    searching, based on comparing the network configuration data and the network planning data, to which RET equipment, if any, the first cell should be linked, and responsive to detecting that the first cell and a first RET equipment should be linked, forming a link between the first cell and the first RET equipment, wherein searching to which RET equipment, if any, the first cell should be linked is based on comparing site name data, base station identifier data, azimuth identifier data, sector identifier data and checking if a second cell, linked to a same antenna or to a same antenna element as the first cell, is linked to a RET equipment;
    updating the link data with information comprising the formed link, if any; and
    using the updated link data in network control operations.

2. The method of claim 1, wherein an error message is provided in response to detecting that the first cell should be linked to a RET equipment but the first cell could not be linked to any RET equipment.

3. The method of claim 1, wherein in response to detecting that no links are missing and/or a cell that is not linked to any RET equipment should not be linked to any RET equipment, providing a confirmation output message.

4. The method of claim 1, further comprising:
responsive to detecting that a link between the first cell and the first RET equipment is formed, checking if angle information of the first RET equipment differs from the network planning data; and
responsive to detecting the angle information of the first RET equipment differs from the network planning data, providing output information comprising an error message and/or initiating corrective actions.

5. The method of claim 1, wherein the method is repeated for all the cells of a base station, all the cells of selected base stations, or all the cells of the network.

6. The method of claim 1, wherein an existing link between a cell and a RET equipment is verified, and
in response to detecting an incorrect link, correcting the link and/or providing output information indicating the incorrect link.

7. An apparatus comprising
a processor, and
a memory including computer program code; the memory and the computer program code configured to, with the processor, cause the apparatus to perform controlling a communications network by
obtaining, from the network, cell identifiers, remote electrical tilt, RET, equipment identifiers, link data comprising information about links between cells and RET equipment, and network configuration data, and, from a data storage, network planning data;
finding a first cell, if any, missing a link to a RET equipment;
searching, based on comparing the network configuration data and the network planning data, to which RET equipment, if any, the first cell should be linked, and responsive to detecting that the first cell and a first RET equipment should be linked and, forming a link between the first cell and the first RET equipment, wherein searching to which RET equipment, if any, the first cell should be linked is based on comparing site name data, base station identifier data, azimuth identifier data, sector identifier data and checking if a second cell, linked to a same antenna or to a same antenna element as the first cell, is linked to a RET equipment;
updating the link data with information comprising the formed link, if any; and
using the updated link data in network control operations.

8. A non-transitory computer program product comprising computer executable program code which when executed by a processor of an apparatus causes the apparatus to control a communications network by:
obtaining, from the network, cell identifiers, remote electrical tilt, RET, equipment identifiers, link data comprising information about links between cells and RET equipment, and network configuration data, and, from a data storage, network planning data;
finding a first cell, if any, missing a link to a RET equipment;
searching, based on comparing the network configuration data and the network planning data, to which RET equipment, if any, the first cell should be linked, and responsive to detecting that the first cell and a first RET equipment should be linked, forming a link between the first cell and the first RET equipment, wherein searching to which RET equipment, if any, the first cell should be linked is based on comparing site name data, base station identifier data, azimuth identifier data, sector identifier data and checking if a second cell, linked to a same antenna or to a same antenna element as the first cell, is linked to a RET equipment;
updating the link data with information comprising the formed link, if any; and
using the updated link data in network control operations.

* * * * *